(12) United States Patent
Stottlemyer

(10) Patent No.: US 6,577,557 B1
(45) Date of Patent: Jun. 10, 2003

(54) WATER COLUMN SOUND SPEED PROFILING SYSTEM

(75) Inventor: Thomas R. Stottlemyer, Mystic, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/077,713

(22) Filed: Feb. 14, 2002

(51) Int. Cl.[7] ............................................. G01S 15/58
(52) U.S. Cl. ......................... 367/127; 367/89; 367/902
(58) Field of Search ......................... 367/89, 127, 131, 367/902

(56) References Cited

U.S. PATENT DOCUMENTS 3,388,372 A * 6/1968 Witz ............................ 367/89
3,441,901 A * 4/1969 Cawley et al. ................ 367/89
3,611,276 A * 10/1971 Massa ......................... 367/134

OTHER PUBLICATIONS

Furlong et al.,Moving Vessel Profiler(MVP) Real Time Near Vertical Data Profiles at 12 Knotts, 1997, IEEE, pp. 229–234.*

Gastouniotis et al., Programmable Deep Ocean Transceiver, 1983, IEEE, pp. 145–149.*

* cited by examiner

Primary Examiner—Daniel T. Pihulic
(74) Attorney, Agent, or Firm—James M. Kasischke; Michael J. McGowan; Michael F. Oglo

(57) ABSTRACT

A system and method for determining a sound speed profile of a water column. A free falling sound source is deployed in the water at a known location and time. The sound source transmits acoustic pulses omnidirectionally therefrom at predetermined times after deployment. An acoustic receiver located at a known location detects each acoustic pulse. The time differential between each predetermined time and a time of arrival for each subsequent acoustic pulse is determined. Speed of sound for each portion of the water column is then determined as a function of the time differential, the known locations of sound source deployment and the acoustic receiver, and the known rate of descent of the sound source. The sound source can be constructed from a hydrodynamic body housing a power source, timing electronics, and spark gap electrodes. A bubble, generated by the spark gap electrodes, implodes to create the acoustic pulse.

18 Claims, 2 Drawing Sheets

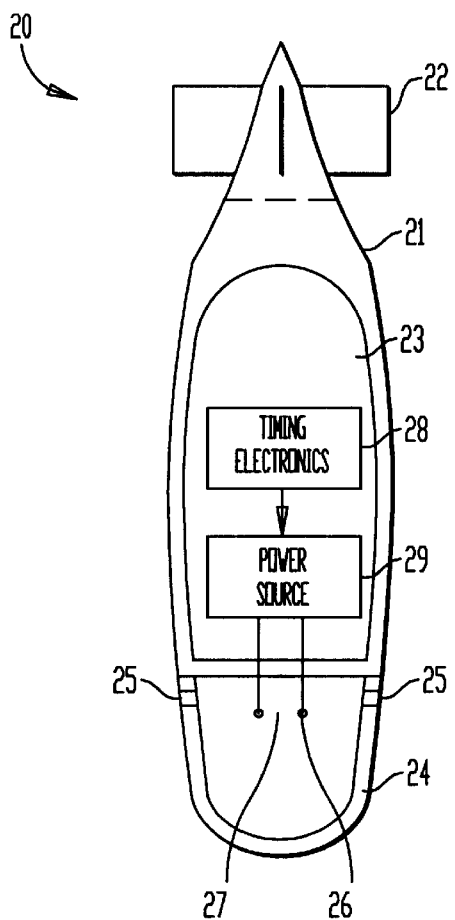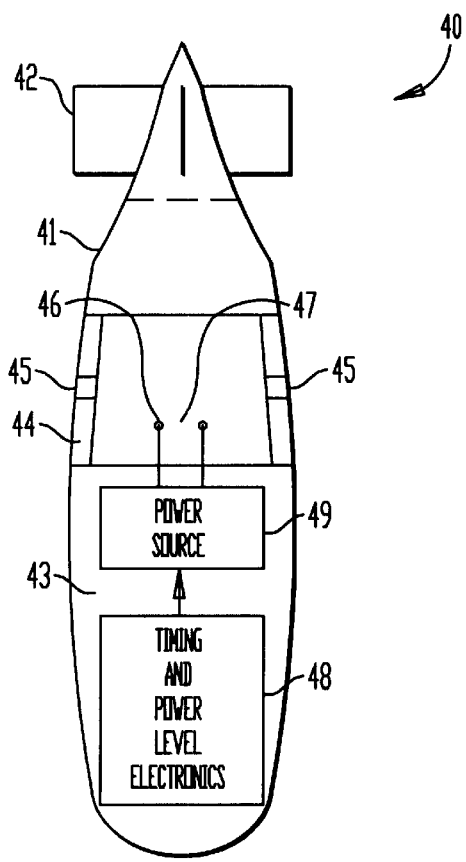

WATER COLUMN SOUND SPEED PROFILING SYSTEM

STATEMENT OF GOVERNMENT INTEREST

The invention described herein may be manufactured and used by or for the Government of the United States of America for Governmental purposes without the payment of any royalties thereon or therefor.

CROSS REFERENCE TO OTHER PATENT APPLICATIONS

Not applicable.

BACKGROUND OF THE INVENTION (1) Field of the Invention

The present invention relates generally to determining sound speed in water, and more particularly to a method and system for determining the sound speed profile of a water column from a moving or stationary position at the water's surface or from some position under the surface.

(2) Description of the Prior Art

Knowledge of a water column's sound velocity profile is useful in predicting performance characteristics of a sonar system. Currently, such sound velocity profiling is accomplished using expendable bathythermometric devices, towed cables or laser Doppler velocimeters. Bathythermometric devices measure water temperature and salinity in determining the speed of sound in water. However, thermistors used to measure temperature have fairly slow response times leading to inaccuracies in sound velocity determination. Towed resonant bubble cables or acoustic sensor cables are tethered to a towing vessel and, therefore, possess all of the drawbacks of towed systems to include their size, equipment needed to store and deploy the towed cable, and the inherent problems associated with towing something through the water. Laser Doppler velocimeters are complex devices requiring a substantial amount of equipment.

SUMMARY OF THE INVENTION

Accordingly, it is an object of the present invention to provide a method and system for determining the sound speed profile of a water column.

Another object of the present invention is to provide a method and system for simply and efficiently determining the sound speed profile of a water column by minimizing the amount of equipment required to do so.

Still another object of the present invention is to provide a method and system for determining the sound speed profile of a water column that does not require the towing or tethering of any equipment to a vessel.

Other objects and advantages of the present invention will become more obvious hereinafter in the specification and drawings.

In accordance with the present invention, a system and method are provided for determining a sound speed profile of a water column. A sound source is deployed in the water at a first known location at a specified time. Deployment can occur from onboard a moving or stationary watercraft. The sound source is free to fall through the water at a known rate of descent. The sound source houses an acoustic source for transmitting acoustic pulses omnidirectionally therefrom at predetermined times after the specified time at which the sound source was deployed. An acoustic receiver located at a second known location detects each acoustic pulse. A processor coupled to the acoustic receiver and programmed with the specified deployment time and predetermined transmit times determines a time differential between each predetermined transmit time and a time of arrival for each corresponding acoustic pulse. Speed of sound for each portion of the water column is then determined as a function of i) the time differential, ii) the first and second known locations, and iii) the known rate of descent of the sound source.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 2 is a schematic view of an embodiment of the expendable acoustic pulsing device for deployment in a water column in accordance with the present invention; and FIG. 3 is a schematic view of another embodiment of the acoustic pulsing device.

DESCRIPTION OF THE PREFERRED EMBODIMENT(S)

Figure 1:
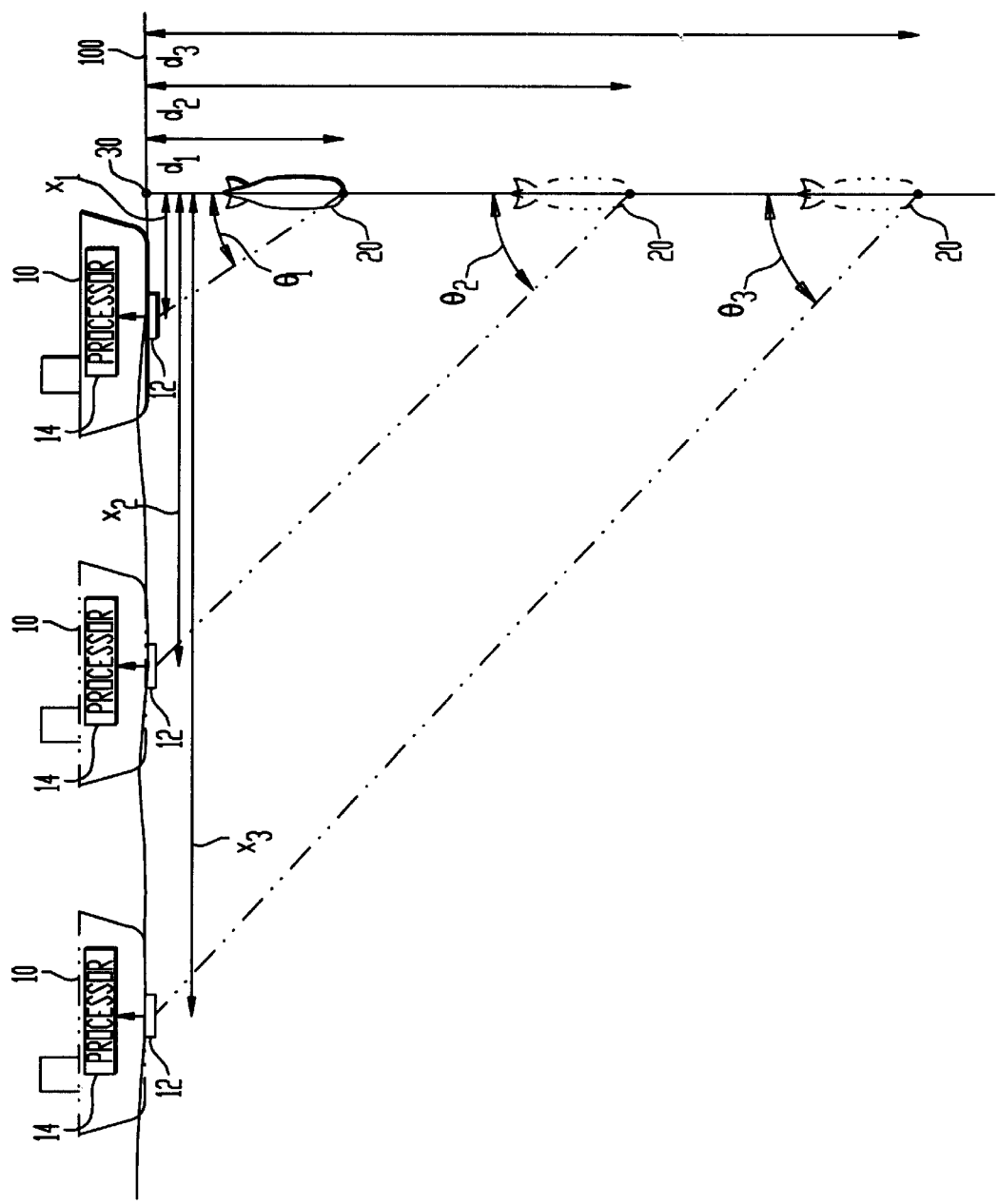
FIG. 1 is a diagrammatic view of an embodiment of a system for determining the sound speed profile of a water column in accordance with the present invention.

Referring now to the drawings, and more particularly to FIG. 1, a diagram of one embodiment of a system and method for determining the sound speed profile of a water column in accordance with the present invention is illustrated. In this embodiment, a watercraft 10 is assumed to be moving right to left along the water's surface which is referenced by numeral 100. It is further assumed that watercraft 10 is moving at a known speed. At a predetermined time and known location, a sound source 20 is deployed (i.e. dropped) from watercraft 10. Sound source 20 can be manually or mechanically released from moving watercraft 10. However, as will be explained further below, scenarios of the present invention are not so limited. For example, watercraft 10 could be moving underwater or could be a stationary craft or buoy deployed at or under the water surface 100.

Sound source 20 is a device that descends via free fall through a water column that is to be profiled in terms of sound speed. In general, sound source 20 emits an omnidirectional broadband acoustic pulse at a number of known predetermined times after deployment. The predetermined times can be spaced evenly or unevenly. Another known quantity utilized by the present invention is the rate at which sound source 20 descends through the water. This essentially constant rate can be determined for any given body that defines sound source 20 as would be well understood by one of ordinary skill in the art.

Utilizing the various known quantities (i.e., location of deployment of sound source 20, rate of descent of sound source 20, time of deployment of sound source 20, times at which sound source 20 emits an acoustic pulse, and speed of watercraft 10), the present invention can determine a sound speed profile of a water column. Referring again to FIG. 1, the determination of sound speed for several consecutive portions of the water column through which sound source 20 falls will be detailed. First, assume that sound source 20 is dropped at a known time t=0 and a known location 30 at water surface 100 as watercraft 10 passes location 30. During a first predetermined time $t_1$, sound source 20 descends a distance $d_1$ that is determined/known based upon sound source 20's known rate of descent and the amount of time between t=0 to $t_1$. During this same amount of time, watercraft 10 has traveled a distance $x_1$ from location 30 that is determined/known based upon the known speed of watercraft 10 and the amount of time from t=0 to $t_1$.

Using standard geometric principles, an angle $\theta_1$ can be determined where $\theta_1$ defines the angle between the vertical descent of sound source 20 and the location of watercraft 10 at time $t_1$ relative to sound source 20. At time $t_1$, sound source 20 emits its first omnidirectional acoustic pulse that is detected at watercraft 10 by an acoustic receiver 12 mounted on watercraft 10. Acoustic receiver 12 could be the existing fathometer used by watercraft 10. Detection of the acoustic pulse is time stamped by a processor 14 coupled to acoustic receiver 12.

Processor 14 is programmed with the time t=0 and the subsequent predetermined times $t_1, t_2, \ldots$, etc. at which an acoustic pulse will be produced by sound source 20. Accordingly, processor 14 can determine a time interval $T_1$ defining the time it takes the first acoustic pulse to travel from sound source 20 to acoustic receiver 12. To determine sound speed $V_1$ in the portion of the water column defined by descent distance $d_1$, processor 14 applies the following relationship $$V_1 = d_1/(T_1 \cos \theta_1) \quad (1)$$

where the expression $T_1 \cos \theta_1$ represents the vertical component of the time interval $T_1$.

Analogous logic can be applied at subsequent predetermined times $t_2$ and $t_3$ to determine sound speeds $V_2$ and $V_3$, respectively, in the portions of the water column traversed by sound source 20 from times $t_1$ to $t_2$ and then times $t_2$ to $t_3$. Specifically, using standard geometric principles, $$V_2 = (d_2 - d_1)/(T_2 \cos \theta_2 - T_1 \cos \theta_1) \quad (2)$$

and $$V_3 = (d_3 - d_2 - d_1)/(T_3 \cos \theta_3 - T_2 \cos \theta_2 - T_1 \cos \theta_1) \quad (3)$$

The above described approach can be extended to each subsequent portion of the water column defined by descending sound source 20.

Although sound source 20 could be realized by a variety of designs without departing from the scope of the present invention, a simple, reliable and inexpensive embodiment thereof will be explained herein. Referring now to FIG. 2, sound source 20 is defined externally by a smooth hydrodynamic body 21 that will descend through a water column in a stable fashion. Tail fins 22 would typically be provided at the aft end of body 21 to aid stability. Body 21 includes a water tight compartment 23 housing electronics components and a nose cone 24 that floods with water via flood ports 25 in nose cone 24. That is, when body 21 is deployed in the water, nose cone 24 fills with water. Nose cone 24 is constructed using an acoustically transparent material such as urethane or other similar material having a specific acoustic impedance that is close to that of water. Mounted in free-flooding nose cone 24 is an electrode pair 26 having a spark gap 27 therebetween. Mounted in watertight compartment 23 are timing electronics 28 coupled to a power source 29 (e.g., a battery) which, in turn, is coupled to electrode pair 26. Compartment 23 can be fitted with an epoxy or other similar material so that body 21 would not have to be a pressure vessel.

At the predetermined times $t_1$, $t_2$, $t_3$, etc., provided by timing electronics 28, power source 29 sends power to electrode pair 26 causing a spark in spark gap 27. The spark forms a vapor cavity or bubble in the water that flooded nose cone 24. The bubble collapses thereby producing the short broadband acoustic pulse (e.g., ranging over several kilohertz) used by the present invention.

The advantages of the present invention are numerous. A sound speed profile of a water column is determined simply and reliably with a minimal amount of equipment. No tethering or towing of equipment is required as the present invention relies on acoustic telemetry as opposed to electric (wire) telemetry. Further, the problems associated with measuring water temperature as a means for determining sound speed are eliminated. The present invention can be used from a moving or stationary watercraft that is deployed at or under the water's surface.

Although the present invention has been described relative to a specific embodiment thereof, it is not so limited. For example, as illustrated in FIG. 3, the spark gap type of sound source could have its free-flooding volume positioned in another part of the sound source's body. In FIG. 3, a sound source 40 has a body 41, tail fins 42 and a watertight compartment 43. A free flooding compartment 44 is defined at a central portion thereof that floods via ports 45 formed therein. An electrode pair 46 is disposed in free flooding compartment 44 and is positioned at or near the center of gravity of body 41 so that bubble production and collapse minimally impacts the stability of sound source 40 as it free falls through a water column.

Sound source 40 further depicts another option for the present invention in cases where sound speed profiles at great depths must be determined. That is, as depth increases, hydrostatic pressure acting on the bubble being produced by electrode pair 46 increases thereby reducing the diameter of the bubble and the acoustic level it produces on collapse. Accordingly, timing and power level electronics 48 can be used to control power source 49 in terms of both time of activation of electrode pair 46 and level of voltage supplied thereto. In this way, at increasing times/depths, a greater amount voltage could be applied to electrode pair 46 to mitigate the depth effects on the bubble produced thereby.

It will thus be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system for determining a sound speed profile of a water column, comprising:

a watercraft moving at a known speed through the water;

a sound source for deployment in the water from said watercraft at a specified time wherein said sound source is free to fall through the water at a known rate of descent, said sound source housing acoustic transmission means for transmitting acoustic pulses omnidirectionally therefrom at predetermined times after said specified time;

an acoustic receiver located on said watercraft for detecting each of said acoustic pulses; and processing means coupled to said acoustic receiver and programmed with said specified time and said predetermined times, said processing means determining a time differential between each of said predetermined times and a time of arrival for each of said acoustic pulses, said processing means further determining speed of sound for each portion of said water column as a function of said time differential, said known speed of said watercraft from said specified time to each of said predetermined times, and said known rate of descent.

2. A system as in claim 1 wherein said sound source comprises:
   a hydrodynamic body having a portion thereof defined by a free-flooding volume enclosed by an acoustically-transparent material;
   an electrode pair mounted in said free-flooding volume to define a spark gap; and
   electronic means mounted in said hydrodynamic body and coupled to said electrode pair, said electronic means supplying power to said electrode pair at said predetermined times.

3. A system as in claim 2 wherein said electrode pair is positioned at the center of gravity of said hydrodynamic body.

4. A system as in claim 2 wherein said acoustically transparent material forms a nose cone of said hydrodynamic body.

5. A system as in claim 1 wherein said acoustic receiver comprises a fathometer used by said watercraft.

6. A system as in claim 1 wherein said processing means is located on said watercraft.

7. A system for determining a sound speed profile of a water column, comprising:
   a watercraft moving at a known speed through the water;
   a hydrodynamic body having a portion thereof defined by a free-flooding volume enclosed by an acoustically-transparent material, wherein said hydrodynamic body is deployed in the water from said watercraft at a specified time and is allowed to freely fall through the water at a known rate of descent;
   an electrode pair mounted in said free-flooding volume to define a spark gap;
   electronic means mounted in said hydrodynamic body and coupled to said electrode pair, said electronic means supplying power to said electrode pair at predetermined times after said specified time to generate a bubble that collapses in said free-flooding volume to produce an acoustic pulse, wherein said acoustic pulse is transmitted omnidirectionally from said free-flooding volume;
   a fathometer used by said watercraft for detecting each said acoustic pulse; and
   processing means coupled to said fathometer and programmed with said specified time and said predetermined times, said processing means determining a time differential between each of said predetermined times and a time of arrival for each said acoustic pulse, said processing means further determining speed of sound for each portion of said water column as a function of said time differential, said known speed of said watercraft from said specified time to each of said predetermined times, and said known rate of descent.

8. A system as in claim 7 wherein said electrode pair is positioned at the center of gravity of said hydrodynamic body.

9. A system as in claim 7 wherein said acoustically transparent material forms a nose cone of said hydrodynamic body.

10. A system as in claim 7 wherein said electronic means includes means for increasing said power at each successive one of said predetermined times.

11. A system for determining a sound speed profile of a water column, comprising:
    a sound source for deployment in the water at a first known location at a specified time wherein said sound source is free to fall through the water at a known rate of descent, said sound source housing acoustic transmission means for transmitting acoustic pulses omnidirectionally therefrom at predetermined times after said specified time;
    an acoustic receiver located at a second known location for detecting each of said acoustic pulses; and
    processing means coupled to said acoustic receiver and programmed with said specified time and said predetermined times, said processing means determining a time differential between each of said predetermined times and a time of arrival for each of said acoustic pulses, said processing means further determining speed of sound for each portion of said water column as a function of said time differential, said first known location and said second known location, and said known rate of descent.

12. A system as in claim 11 wherein said sound source comprises:
    a hydrodynamic body having a portion thereof defined by a free-flooding volume enclosed by an acoustically-transparent material;
    an electrode pair mounted in said free-flooding volume to define a spark gap; and
    electronic means mounted in said hydrodynamic body and coupled to said electrode pair, said electronic means supplying power to said electrode pair at said predetermined times.

13. A system as in claim 12 wherein said electrode pair is positioned at the center of gravity of said hydrodynamic body.

14. A system as in claim 12 wherein said acoustically transparent material forms a nose cone of said hydrodynamic body.

15. A method of determining a sound speed profile of a water column, comprising:
    deploying a sound source in the water at a first known location at a specified time wherein said sound source is free to fall through the water at a known rate of descent;
    transmitting omnidirectional acoustic pulses from said sound source at predetermined times after said specified time;
    detecting each of said acoustic pulses at a second known location;
    determining a time differential between each of said predetermined times and a time of arrival for each of said acoustic pulses; and
    determining speed of sound for each portion of said water column as a function of said time differential, said first known location and said second known location, and said known rate of descent.

16. A method according to claim 15 wherein said step of transmitting comprises the step of generating a bubble in the water that collapses at each of said predetermined times to produce one of said acoustic pulses.

17. A method according to claim 15 wherein said step of deploying comprises the step of dropping said sound source in the water from a watercraft moving at a known speed through the water, wherein said second known location is determined at each of said predetermined times as a function of said known speed through the water.

18. A method according to claim 17 wherein said step of transmitting comprises the step of generating a bubble in the water that collapses at each of said predetermined times to produce one of said acoustic pulses.

* * * * *